United States Patent
Erell et al.

(10) Patent No.: US 9,237,459 B1
(45) Date of Patent: Jan. 12, 2016

(54) SYSTEM AND METHOD FOR MEASURING CHARACTERISTICS OF NEIGHBOR CELLS USING A SYNTHESIZED COMPOSITE ANTENNA PATTERN

(75) Inventors: Adoram Erell, Herzliya (IL); Daniel Yellin, Ra'anana (IL); Krishna Srikanth Gomadam, Santa Clara, CA (US)

(73) Assignee: MARVELL INTERNATIONAL LTD, Hamilton (BM)

( * ) Notice: Subject to any disclaimer, the term of this patent is extended or adjusted under 35 U.S.C. 154(b) by 732 days.

(21) Appl. No.: 13/314,215

(22) Filed: Dec. 8, 2011

Related U.S. Application Data

(60) Provisional application No. 61/421,825, filed on Dec. 10, 2010.

(51) Int. Cl.
*H04B 17/00* (2015.01)
*H04W 24/00* (2009.01)

(52) U.S. Cl.
CPC ........... *H04W 24/00* (2013.01); *H04B 17/0042* (2013.01)

(58) Field of Classification Search
CPC .... H04L 1/0026; H04W 24/08; H04W 24/00; H04B 17/0057; H04B 17/0042; A01B 12/006
USPC .................. 455/67.11, 522, 507, 562.1, 13.3; 370/334
See application file for complete search history.

(56) References Cited

U.S. PATENT DOCUMENTS

| | | | | |
|---|---|---|---|---|
| 6,754,475 B1 * | 6/2004 | Harrison | .............. | H04B 7/0615 455/115.1 |
| 8,526,413 B2 * | 9/2013 | Lin | ........................ | H04B 7/022 370/344 |
| 2006/0293056 A1 * | 12/2006 | Kim | ...................... | H04W 36/18 455/442 |
| 2007/0081480 A1 * | 4/2007 | Cai | ......................... | H04W 4/02 370/312 |
| 2008/0002628 A1 * | 1/2008 | Bi | ...................... | H04W 36/0083 370/335 |
| 2008/0220806 A1 * | 9/2008 | Shin | ...................... | H04W 52/08 455/522 |
| 2008/0247475 A1 * | 10/2008 | Kim | ...................... | H04B 7/0417 375/260 |
| 2009/0011757 A1 * | 1/2009 | Tenny | .................... | H04W 36/30 455/425 |
| 2009/0233594 A1 * | 9/2009 | Duschesne | .......... | H04W 52/247 455/423 |
| 2009/0291691 A1 * | 11/2009 | Jeong | .................. | H04W 72/048 455/450 |
| 2012/0195221 A1 * | 8/2012 | Wang | .................. | H04W 72/005 370/252 |
| 2015/0156651 A1 * | 6/2015 | Nilsson | ................. | H04W 24/08 455/67.11 |

OTHER PUBLICATIONS

Ericsson, "UE impacts of Cell DTX in LTE", 3GPP TSG-RAN WG1 # 60, San Francisco, USA, Feb. 22-26, 2010.
3GPP TS 36.214, "3rd Generation Partnership Project; Technical Specification Group Radio Access Network; Evolved Terrestrial Radio Access (E-UTRA); Physical layer; Measurements (Release 9)", version 9.2.0, Jun. 2010.

* cited by examiner

*Primary Examiner* — Wesley Kim
*Assistant Examiner* — Md Talukder

(57) ABSTRACT

A method includes receiving in a receiver transmissions from a serving cell that serves the receiver and from one or more neighbor cells. The transmissions are received via multiple receive antennas to produce multiple respective output signals. The multiple output signals are weighed with respective weights, and the weighted output signals are combined to produce a combined output signal. The weights are selected so as to form a composite antenna pattern having a first antenna gain in one or more first directions that point toward the neighbor cells, and a second antenna gain, lower than the first antenna gain, in a second direction that points toward the serving cell. Characteristics of the one or more neighbor cells are measured by processing the combined output signal in which the transmissions received from the serving cell are attenuated.

24 Claims, 2 Drawing Sheets

SYSTEM AND METHOD FOR MEASURING CHARACTERISTICS OF NEIGHBOR CELLS USING A SYNTHESIZED COMPOSITE ANTENNA PATTERN

CROSS-REFERENCE TO RELATED APPLICATIONS

This application claims the benefit of U.S. Provisional Patent Application 61/421,825, filed Dec. 10, 2010, whose disclosure is incorporated herein by reference.

FIELD OF THE DISCLOSURE

The present invention relates generally to communication systems, and particularly to methods and systems for measuring cell characteristics in wireless communication networks.

BACKGROUND

In some cellular communication networks, a communication terminal that is served by a certain cell is required to detect and measure signals of neighboring cells. For example, in Evolved Universal Terrestrial Radio Access (E-UTRA) systems, also referred to as Long Term Evolution (LTE) systems, neighbor cell measurements are described in "3rd Generation Partnership Project; Technical Specification Group Radio Access Network; Evolved Universal Terrestrial Radio Access (E-UTRA); Physical layer; Measurements (Release 9)," TS 36.214, version 9.2.0, June, 2010, which is incorporated herein by reference.

The description above is presented as a general overview of related art in this field and should not be construed as an admission that any of the information it contains constitutes prior art against the present patent application.

SUMMARY

An embodiment that is described herein provides a method in a receiver. The method includes receiving in the receiver transmissions from a serving cell that serves the receiver and from one or more neighbor cells. The transmissions are received via multiple receive antennas to produce multiple respective output signals. The multiple output signals are combined to produce a combined output signal, while weighting the multiple output signals with respective weights that are selected so as to reduce a signal level of the serving cell in the combined output signal. Characteristics of the one or more neighbor cells are measured by processing the combined output signal in which the signal level of the serving cell is reduced.

In some embodiments, receiving the transmissions includes receiving from the serving cell and from the neighboring cells respective reference waveforms that overlap in time and frequency, and the measuring characteristics of the one or more neighbor cells includes estimating the characteristics by processing the overlapping reference waveforms.

In an embodiment, weighting the output signals includes selecting the weights in accordance with a criterion that minimizes the signal level of the serving cell. In a disclosed embodiment, the criterion further maximizes the signal level of the neighbor cells. In another embodiment, weighting the output signals includes estimating a channel response of a communication channel between the serving cell and the receiver, and selecting the weights based on the estimated channel response.

In another embodiment, the method includes reporting the measured characteristics of the neighbor cells to the serving cell. In an embodiment, reporting the measured characteristics includes correcting the measured characteristics so as to compensate for the weights. In an example embodiment, combining the multiple output signals includes weighting the output signals with the weights only when the serving cell and the neighbor cells are synchronized with one another. In an embodiment, weighting the output signals includes forming a composite antenna pattern having a spatial null directed toward the serving cell.

There is additionally provided, in accordance with an embodiment that is described herein, apparatus including multiple receive antennas, a receiver and a processor. The receiver is configured to receive transmissions from a serving cell that serves the receiver and from one or more neighbor cells. The transmissions are received via the multiple receive antennas so as to produce multiple respective output signals. The processor is configured to combine the multiple output signals to produce a combined output signal, while weighting the multiple output signals with respective weights that are selected so as to reduce a signal level of the serving cell in the combined output signal, and to measure characteristics of the one or more neighbor cells by processing the combined output signal in which the signal level of the serving cell is reduced.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
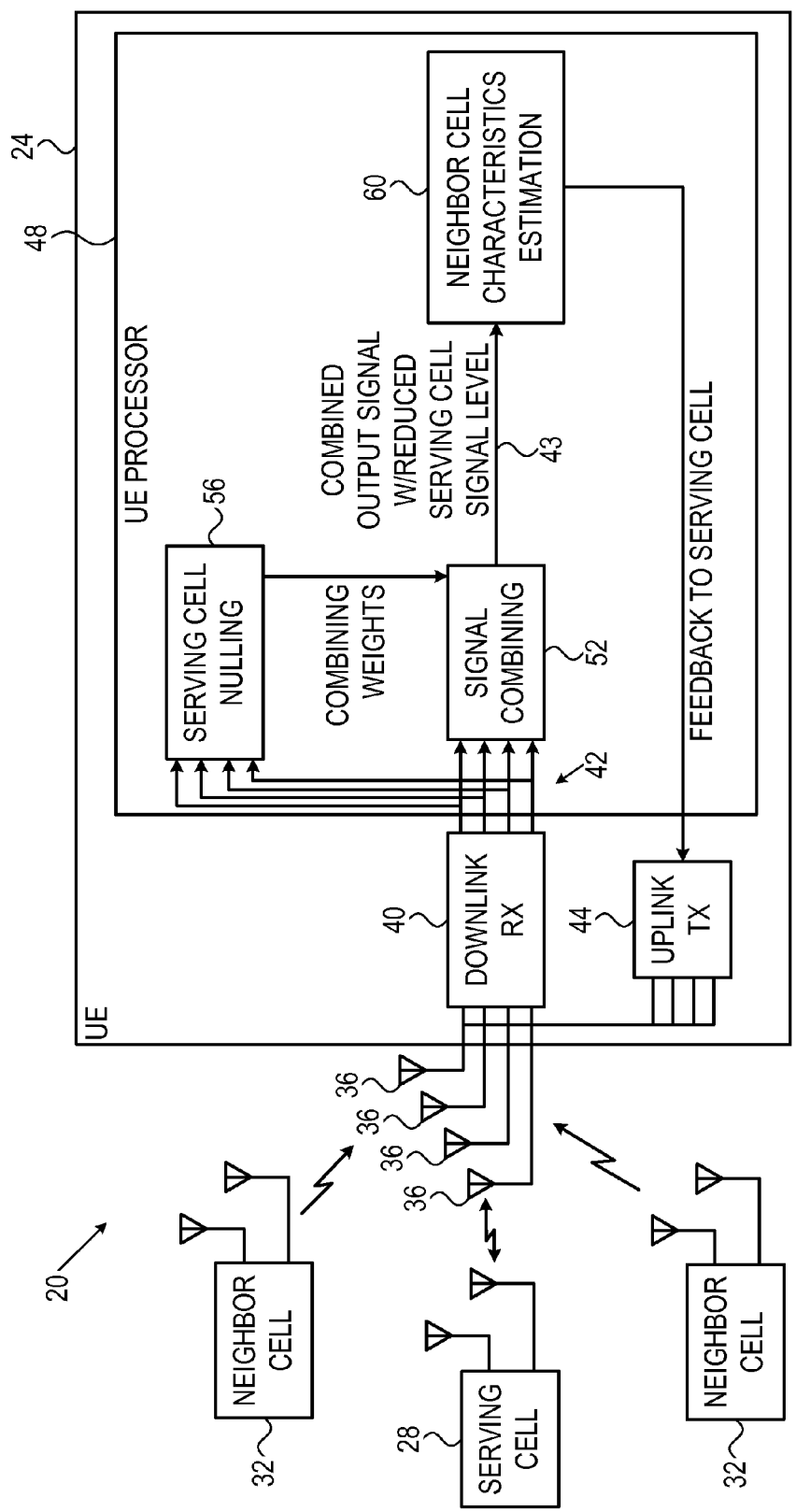
FIG. 1 is a block diagram that schematically illustrates a wireless communication system, in accordance with an embodiment that is described herein.

Embodiments that are described herein provide improved methods and systems for measuring characteristics of neighbor cells by mobile communication terminals. Although the embodiments described herein refer mainly to User Equipment (UE) in LTE or LTE-Advanced (LTE-A) networks, the disclosed techniques can also be used in other suitable network types.

The methods and systems described herein improve the accuracy and speed of neighbor cell measurements by temporarily reducing the received level of the serving cell's downlink signal, which in some cases interferes with the neighbor cell measurements. Serving cell suppression is typically activated during a neighbor cell search process, and disabled during normal communication with the serving cell. In some embodiments, the UE receives the serving cell and neighbor cell transmissions via multiple receive antennas, so as to produce multiple respective output signals.

The UE combines the multiple output signals to produce a combined output signal, while weighting each output signal with a respective weight. The weights are chosen so as to reduce the signal level of the serving cell in the combined output signal. This operation can be viewed as forming a composite receive antenna pattern having a spatial null in the direction of the serving cell.

The UE then measures the neighbor cell characteristics using the combined output signal. Since the influence of the signal level of the serving cell in the combined output signal is reduced as a result of the proper choice of weights, the neighbor cell characteristics are measured with higher accuracy and greater speed than when subject to interference of the signal from the serving cell, in an embodiment. Several example schemes for computing the weights are described herein. The UE typically reports the measured neighbor cell characteristics to the serving cell. Several reporting schemes are described further below. Some reporting schemes are dependent on the weights, and others are independent of the weights.

The disclosed techniques are useful, for example, in scenarios in which the neighbor cell signals are considerably weaker than the serving cell signal. A UE may be required to measure weak neighbor cell signals in the presence of a strong serving cell signal in various scenarios. For example, some cells are defined as Closed Subscription Group (CSG) cells, which serve only a predefined closed group of UEs. When a UE is located in close proximity to a CSG cell but does not belong to the group, the UE will typically attempt to connect to the cell, but will be rejected and will search for other, weaker cells.

As another example, the network may attempt to reduce the load on a busy cell by handing-off UEs to other cells that are not as busy. For these UEs, the busy cell is often considerably stronger than the other cells, but in an effort to reduce load on the busy cell, the UEs are nevertheless required to detect and measure the other cells in order to enable hand-off. As yet another example, some networks support UEs that travel at very high velocities, e.g., 300-400 Km/hour. At high velocities, the UE sometimes needs to be handed-off from one cell to another along its route within seconds. The cell to which the UE will be handed-off may be initially very weak, but the UE is still required to detect and measure it rapidly.

The scenarios above are presented purely by way of example, in order to demonstrate circumstances in which neighbor cell signal measurements are performed in the presence of a strong serving cell signal. The disclosed techniques, however, can be used in any other suitable scenario, including less demanding scenarios in which the neighbor cells are not weaker than the serving cell. The disclosed techniques can be useful in substantially any scenario, for example because they reduce the number of detection attempts of neighbor cells and therefore extend battery life.

FIG. 1 is a block diagram that schematically illustrates a wireless communication system 20, in accordance with an embodiment that is described herein. In the present example, system 20 comprises a LTE or LTE-A system. In alternative embodiments, system 20 may operate in accordance with any other suitable communication standard or protocol that uses neighbor cell measurements, such as, for example, Global System for Mobile communications (GSM), Code Division Multiple Access (CDMA), WiMAX and Universal Mobile Telecommunications System (UMTS) protocols such as Wideband CDMA (WCDMA) and CDMA-2000.

System 20 comprises a mobile communication terminal (UE) 24, for example a cellular phone, a wireless-enabled mobile computing device, or any other suitable type of communication terminal. UE 24 is served by a serving cell 28. One or more neighbor cells 32 are also within reception range of the UE. Although FIG. 1 shows only a single UE and three cells in order to maintain clarity for teaching purposes, real-life systems typically comprise large numbers of UEs and cells.

UE 24 receives downlink signals via multiple receive antennas 36. In the present example UE 24 comprises four receive antennas. In alternative embodiments, the UE may comprise any suitable number of receive antennas, such as two or eight antennas. In the present example antennas 36 are also used for uplink transmission from the UE to the serving cell, although in alternative embodiments the UE may comprise separate transmit antennas.

In the embodiment of FIG. 1, a downlink receiver (RX) 40 receives the downlink signals from antennas 36, down-converts the signals to baseband, and performs other reception functions such as filtering, amplification and digitization. The downlink receiver thus produces multiple output signals 42 that respectively correspond to the signals received by antennas 36. The multiple output signals are provided to a UE processor 48. The UE processor processes these signals so as to decode the data transmitted to the UE from the serving cell.

In some embodiments, UE processor 48 carries out a neighbor cell search process that detects and measures signals from neighbor cells 32, and then reports the measured characteristics of the neighbor cells as feedback to the serving cell. The feedback is transmitted to the serving cell over the uplink by an uplink transmitter (TX) 44, for example.

Typically, output signals 42 produced by receiver 40 contain signal components from the serving cell transmission as well as neighbor cell transmissions. In some embodiments, UE processor 48 processes the multiple output signals so as to produce a combined output signal 43 in which the signal level of the serving cell's transmission is reduced. The UE processor then measures the neighbor cell characteristics using the combined output signal. Since the serving cell signal level is reduced in the combined output signal, the UE processor is able to measure the neighbor cell characteristics with high accuracy and speed.

In the example of FIG. 1, UE processor 48 comprises a signal combining module 52, which combines the multiple output signals to produce the combined output signal. Module 52 combines the output signals while weighting each output signal with a respective weight. The weights, which typically comprise complex numbers, are selected such that the respective impact or influence of the serving cell's signal is reduced relative to other signals. UE processor 48 comprises a serving cell nulling module 56, which computes the weights to be applied by combining module 52. The nulling process carried out by module 52 can be viewed as a kind of spatial filtering that is applied to output signals 42.

The combined output signal is provided to a neighbor cell characteristic estimation module 60, which estimates the neighbor cell characteristics based on this signal. Module 60 generates feedback information, which reports the measured characteristics of the neighbor cells. Module 60 provides the feedback information to uplink transmitter 44, which transmits the feedback information to serving cell 28 over the uplink channel.

The UE configuration shown in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and processor 48, are implemented in hardware, such as using one or more Radio Frequency Integrated Circuits (RFICs), Field-Programmable Gate Arrays (FPGAs) or Application-Specific Integrated Circuits (ASICs). In alternative embodiments, certain UE elements are implemented in software, or using a combination of hardware and software elements. In some embodiments, certain UE elements, such as certain elements of UE processor 48, are implemented in a programmable processor, which is programmed in software to carry out the functions described herein. The software may be downloaded, in whole or in part, to the processor in electronic form, over a network, for example, or it may, alternatively or additionally, be provided and/or stored on non-transitory tangible media, such as magnetic, optical, or electronic memory.

Figure 2:
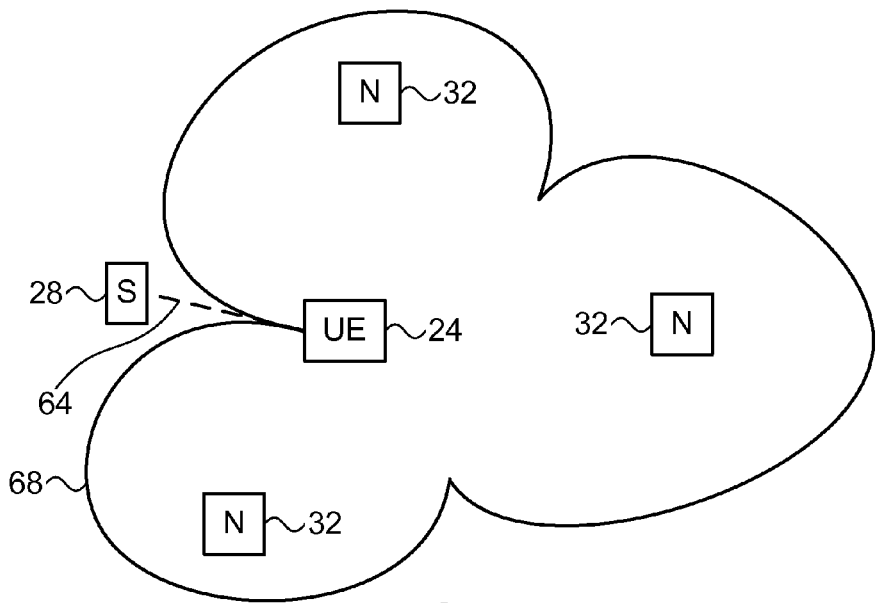
FIG. 2 is a diagram showing a spatial radiation pattern formed by weighting multiple receive antennas, in accordance with an embodiment that is described herein.

FIG. 2 is a diagram showing an example of a spatial radiation pattern formed by weighting multiple receive antennas 36, in accordance with an embodiment that is described herein. As explained above, UE processor 48 applies respective complex weights to the output signals produced by receive antennas 36, and then combines the weighted signals. The weights are chosen, as will be explained in detail below, so as to reduce the level of the serving cell signal in the combined output signal. The weighted combining process can be viewed as forming a composite receive antenna pattern for the UE. The gain of the composite antenna pattern at various directions depends on the choice of weights that are applied to the respective signals.

The example of FIG. 2 illustrates an example top view of a certain geographical area around UE 24. This area contains UE 24, serving cell 28 (marked "S") and three neighbor cells 32 (marked "N"). For the purpose of simplicity only three neighbor cells 32 are seen; in actuality there may be a greater or lesser number of neighbor sells 32. The direction from the UE to the serving cell is marked with a dashed line 64. For a certain choice of weights, the composite receive antenna pattern is illustrated by a contour 68. For any given direction from UE 24, the distance of contour 68 from the UE is indicative of the gain of the composite antenna pattern at that direction.

As can be seen in the figure, the composite antenna pattern has a spatial null in the direction of serving cell 28. This null is formed by proper choice of weights that are applied to the respective output signal 42, as will be explained in detail below. At the same time, the composite antenna pattern has a relatively high gain in the directions of neighbor cells 32. The attenuation is thus directional—Relatively high along line 64 and lower in other directions. These gains are reflected in the relative levels of the serving cell and neighbor cell signals in the composite output signal (output of module 52 of FIG. 1). Therefore, as a result of forming this spatial null, the serving cell signal is attenuated sharply in comparison with the neighbor cell signals. The attenuation factor may depend, for example, on the response of the communication channel from the serving cell to the UE, the accuracy with which the UE measures this channel response, and the number of UE receive antennas.

In some embodiments, UE 24 performs a two-stage neighbor cell search. In the first stage, the UE estimates the channel response from the serving cell to the UE, and then detects neighbor cells. In the second stage, the UE weights and combines the multiple output signals from the receive antennas, as explained above, and measures the neighbor cell signal characteristics using the combined output signals.

In the first stage (channel estimation, neighbor cell detection) the UE typically processes synchronization signals that are transmitted by the serving and neighbor cells. In the second stage (neighbor cell characteristics measurements) the UE typically processes pilot signals, also referred to as reference signals, which are transmitted by the neighbor cells.

In many practical scenarios, the serving cell and the neighbor cells are synchronized with one another, meaning that the synchronization and pilot signals are transmitted from the serving and neighbor cells on the same time and frequency resources. Moreover, cooperative transmission schemes (in which one cell inhibits its transmission in order to avoid interference to another cell) cannot be applied to synchronization and pilot signals. Therefore, reducing the serving cell signal level using the disclosed techniques is of particular importance in synchronized communication systems.

In an example embodiment, consider a UE that has N receive antennas, and receives a strong signal from its serving cell, a weaker signal from a yet undetected neighbor cell, and other weaker interference. The received signals at the UE receive antennas can be written as:

$$Y = H_0 x_0 + H_1 x_1 + v \quad \text{Equation 1}$$

wherein Y denotes a received signal vector of length N, $H_0$ and $H_1$ denote that Single-Input Multiple-Output (SIMO) channel vectors for the serving cell and neighbor cell, respectively, and $v$ denotes the additional interference. Signal $x_1$ denotes the synchronization signal transmitted by the neighbor cell that the UE attempts to detect, and $x_0$ denotes the interfering signal transmitted from the serving cell simultaneously with $x_1$. We assume that $x_0, x_1, H_1$ and $v$ are unknown to the UE, although the second-order statistics of $H_1 x_1 + v$ can be estimated.

In one embodiment, we assume that $H_0$ is known to UE 24 with high accuracy. In this embodiment, an optimal strategy for UE 24 would be to process signal Y such that the $H_0 x_0$ term in Equation 1 is zero while retaining the potential contribution of the $H_1 x_1$ term. This goal is achieved, for example, by combining the received signals (elements of vector Y) after weighting them with a weight vector denoted $W^H$:

$$Z = W^H Y \quad \text{Equation 2}$$

wherein $W^H$ is a unit-normalized vector that is orthogonal to $H_0$. As noted above, this process is equivalent to forming a spatial null in the direction of the serving cell.

In the case of two receive antennas (N=2), there exists only a single solution for $W^H$ that is orthogonal to $H_0$, and module 56 typically selects this single solution as the set of weights that are applied to the output signals. For a larger number of receive antennas, there typically exist multiple such solutions for $W^H$. In some embodiments, module 56 selects the set of weights from among the multiple solutions of Equation 2 in accordance with a certain criterion.

Consider, for example, a scenario in which the power of $H_1 x_1 + v$ is dominated by $H_1 x_1$, or a scenario in which $v$ is spatially white (i.e., the noise covariance matrix $(vv^H)$ is approximately diagonal) but the channel covariance for the neighbor cell $H_1 H_1^H$ is not spatially white. In any of these scenarios, an optimal strategy for UE 24 is to select the solution of Equation 2 that maximizes the average power of $H_1 x_1 + v$. This selection is equivalent to maximizing the average power of z, since the contribution of the $H_0$ term is zero for any of the solutions.

In accordance with the above example criterion, module 56 selects the set of weights $W_i^H$ that maximizes the expression:

$$\tilde{W} = \text{ArgMax}\{W_i^H \langle YY^H \rangle W_i\} \quad \text{Equation 3}$$

wherein $W_i^H$ are the set of vectors that are orthogonal to $H_0$.

In an alternative embodiment, consider a scenario in which the channel from the serving cell ($H_0$) varies over time during the time interval over which the neighbor cell signal is searched for. In this embodiment, the UE estimates the channel $H_0$ by performing certain averaging over this time interval. In such a scenario, an optimal strategy for the UE would be to choose the solution $W^H$ of Equation 2 that minimizes the contribution of the serving cell signal to signal z, when averaged over the time interval over which the neighbor cell search is performed.

In this embodiment, module 56 selects the set of weights according to:

$$\tilde{W} = \text{ArgMin}\{W^H \langle H_0 H_0^H \rangle W\} \quad \text{Equation 4}$$

constrained by:

$$W^H W = 1 \quad \text{Equation 5}$$

wherein the $\langle \ldots \rangle$ brackets in Equation 4 denote averaging over the neighbor cell search time interval. The solution for $W^H$ is given by:

$$\tilde{W}^H = \text{eigMin}\langle H_0 H_0^H \rangle \quad \text{Equation 6}$$

wherein eigMin$\langle A \rangle$ denotes the eigenvector of A having the smallest eigenvalue. If no averaging is performed, Equation 6 yields a normalized vector that is orthogonal to $H_0$ with an eigenvalue of zero.

In yet another embodiment, consider a scenario where the serving cell transmits multiple spatial streams simultaneously using multiple transmit antennas. In this embodiment, the $H_0 x_0$ term in Equation 1 is generalized such that $H_0$ denotes a Multiple-Input Multiple-Output (MIMO) channel matrix, and $x_0$ denotes a vector whose elements correspond to the spatial streams. Since the spatial streams are statistically independent and therefore uncorrelated, the solution of Equation 4 holds. In the MIMO case, however, effective suppression of the serving cell signals is typically achieved when the number of receive antennas 36 in the UE is larger than the number of spatial streams.

In still another embodiment, module 56 (FIG. 1) uses the solution of Equation 4 when the serving cell transmits a single spatial stream with time-varying precoding, where the precoding is unknown to the UE but the UE is able to estimate the channel to each of the transmit antennas of the serving cell. In this case, effective suppression of the serving cell signals is typically achieved when the number of receive antennas 36 in the UE is larger than the number of transmit antennas in the serving cell.

In some cases, the UE is unable to estimate the channel from the serving cell ($H_0$) for the time interval over which neighbor cell search is performed, but can assume that the serving cell signal dominates the received signal. In some embodiments, module 56 finds the set of weights $W^H$ that minimizes the total average power of z:

$$\tilde{W} = \text{ArgMin}\{W^H \langle YY^H \rangle W\} \quad \text{Equation 7}$$

together with constraining the weights to unit-normalization, yields the following solution:

$$\tilde{W}^H = \text{eigMin}\langle YY^H \rangle \quad \text{Equation 8}$$

Since the serving cell signal dominates the received signal, this solution will primarily suppress the serving cell signal. In general, it is possible to use the following formula:

$$\tilde{W} = \text{eigMAX}\{\langle H_0 H_0^H + \alpha I \rangle^{-1} YY^H\} \quad \text{Equation 9}$$

wherein $\alpha$ denotes a small regularization constant to ensure matrix inversion.

The above description outlined several example methods for computing the set of weights to be applied to the output signals before combining, in order to reduce (if not minimize) the serving cell signal level in the combined output signal. In alternative embodiments, module 56 in UE processor 48 may compute the weights using any other suitable method.

Typically, the effectiveness of the serving cell signal suppression varies from one scenario to another, and depends on the level of $W^H \langle H_0 H_0^H \rangle W$ relative to the other signals. As explained above, effective suppression is achieved, for example, when $H_0$ is known with high accuracy during the search interval, and in a MIMO scenario when the number of UE receive antennas is larger than the number of serving cell transmit antennas.

One example of such a scenario is in a synchronized system in which the serving and neighbor cells transmit synchronization signals simultaneously, each from a single transmit antenna port. In such a system, the UE may estimate the SIMO channel response $H_0$ during the first stage of the two-stage process, and use an optimal $W^H$ for neighbor cell detection in the second stage. One example of a synchronized system is a Time Division Duplex (TDD) LTE system, in which the serving and neighbor cell comprise TDD LTE cells.

Even in a system that is not inherently synchronized, there are scenarios where synchronization is highly probable. One such embodiment is an LTE Release 9 (or higher) system, whether TDD or Frequency Division Duplex (FDD), with multicast transmissions. Another embodiment is an LTE Release 10 (or higher) system. In these embodiments, the UE can apply the above-described two-stage process to search for synchronized neighbor cells, in addition to any neighbor cells that were found in the first stage.

If the system is not synchronized and $H_0$ varies during the neighbor cell search interval, the serving cell signal suppression will typically be effective if the variation in $H_0$ is small. The variation is small, for example, if the serving cell uses a fixed precoding scheme, and if the UE motion-induced Doppler shift is small relative to the inverse of the search time interval. Fixed precoding occurs, for example, when the serving cell has a single transmit antenna. As noted above, one of the applicable scenarios for the disclosed techniques involves Closed Subscription Group (CSG) cells, which very often have a single antenna due to their small size.

In some embodiments, UE processor 48 activates the serving cell suppression technique (i.e., applies the weights and combines the weighted output signals) only upon verifying that the serving cell and neighbor cells are synchronized with one another. Otherwise, serving cell suppression is deactivated. The UE processor may verify whether system 20 is synchronized in various ways. In one embodiment, the UE is preconfigured with this information. In another embodiment, the UE is notified with this information by the serving cell.

After detecting the neighbor cells, UE processor 48 (FIG. 1) measures characteristics of the signals received from the neighbor cells, and reports the measured characteristics to the serving cell. In various embodiments, module 60 in processor 48 measures various types of the neighbor cell signals. Module 60 measures these characteristics by processing the combined output signal, in which the level of the serving cell signal has been reduced. In some embodiments, module 60 estimates the received power level and quality of the neighbor cell signals. The estimated characteristics may comprise, for example, Reference Signal Received Power (RSRP), Received Signal Strength Indication (RSSI), Channel State Information (CSI), or any other suitable characteristic.

In an LTE system, for example, the measurements are typically performed on pilot signals, e.g., Common Reference Signals (CRS) that are transmitted by the neighbor cells. The same two stage procedure described above for neighbor cell detection is also used for the measurements, in an embodiment. In the first stage the UE estimates the MIMO channel $H_0$ from the serving cell's CRS over a time interval in which CRS from both the serving and neighbor cells are expected. In the second stage the UE measures the serving cell's CRS received characteristics.

As noted above, module 60 in UE processor 48 generates feedback information based on the measured neighbor cell signal characteristics, and the feedback information is reported to the serving cell. Unlike conventional UEs, however, the disclosed techniques measure the neighbor cell signal characteristics on a weighted combination of the received signals. Unless accounted for, this type of measurement may distort the feedback information and cause it to be noncompliant with system requirements.

In LTE, for example, the RSRP is defined as the maximum received power level among the receive antennas, i.e.:

$$RSRP = \text{Max}\{\|\hat{h}_n\|^2\} \qquad \text{Equation 10}$$

wherein $w_n$ denotes the estimated pilot or synchronization signal in the $n^{th}$ receive antenna, and $\|\hat{h}_n\|^2$ denotes the estimated received power in the $n^{th}$ receive antenna. Measurement in accordance with Equation 1, on the other hand, would yield a different expression for RSRP, which depends on the weights that are applied to the output signals:

$$RSRP' = \left\|\sum_n w_n \hat{h}_n\right\|^2 \qquad \text{Equation 11}$$

wherein $w_n$ are the weights, i.e., the elements of W.

In some embodiments, module 60 reports feedback information that is directly dependent on the measured characteristics. In these embodiments, the feedback information is dependent on the weights. This form of reporting is useful, since it is indicative of the potential reception quality of the neighbor cells, if the UE were to suppress the interference of the serving cell.

In alternative embodiments, module 60 applies certain correction to the measured characteristics while generating the feedback information, in order to factor out the dependence on the weights. In these embodiments, the feedback information does not account for the fact that the UE is able to suppress the interference from the serving cell if needed. This form of reporting is useful since it is compliant with current standards, e.g., the LTE specifications and particularly Equation 10.

In some embodiments, the feedback information comprises a measure called Reference Signal received Quality (RSRQ), which is roughly equal to the ratio between the reference signal received power (RSRP) and the total received power (RSSI):

$$RSRQ = \frac{RSRP}{RSSI} \qquad \text{Equation 12}$$

In embodiments in which the RSRP is computed according to Equation 10, i.e., independently of the weights, the RSSI should also be computed independently of the weights. In some embodiments, however, the RSRQ is computed while accounting for the weights. This sort of RSRQ reporting, for example, may provide the network better guidance as to whether to off-load the UE to a weaker cell. In these embodiments, the RSRP is computed using Equation 11, and the RSSI is computed on the combined signal z:

$$RSSI = \left\|\sum_n w_n Y_n\right\|^2 \qquad \text{Equation 13}$$

The neighbor cell signal characteristics described above are typically used for mobility management, e.g., to decide when and to which cell to hand-off the UE. Additionally or alternatively, in some embodiments the measured characteristics comprise the CSI of the communication channels between the UE and the neighbor cells. This type of characteristic is used, for example, for setting the Modulation and Coding Scheme (MCS) of downlink transmissions to the UE, or for configuring Coordinated Multipoint (COMP) transmissions to the UE from multiple cells. CSI estimation is typically based on neighbor cell pilot signal (e.g., CRS) measurements.

In some embodiments, system 20 employs a COMP scheme in which the serving cell is able to inhibit its own transmission to allow the UE to measure neighbor cell signals. In these embodiments, suppression of the serving cell signal using the disclosed techniques may be redundant. However, the disclosed techniques can be used for measuring the Channel State Information (CSI) of a weak neighbor cell in the presence of interference from a dominant neighbor cell. $H_0$ in Equation 1 refers now to the channel of the dominant neighbor cell, and $H_1$ to the weak neighbor cell. In these embodiments, UE processor 48 should typically estimate the CSI of the weaker cell, i.e., the elements of $H_1$, rather than detect it. However, even if the dominant cell inhibition is highly effective such that the signal z is dominated by $H_1 x_1$, the UE would only be able to measure the combined signal given by $$Z \approx W^H H_1 \qquad \text{Equation 14}$$

rather than the elements of $H_1$ individually.

One possible way to measure the elements of $H_1$ individually is to generate additional sums of the form of Equation 14, each with a different set of weights, thus solving multiple equations for the $H_1$ elements. Such a technique is feasible if multiple sets of weights can be found, such that each set suppresses the stronger cell effectively.

Figure 3:
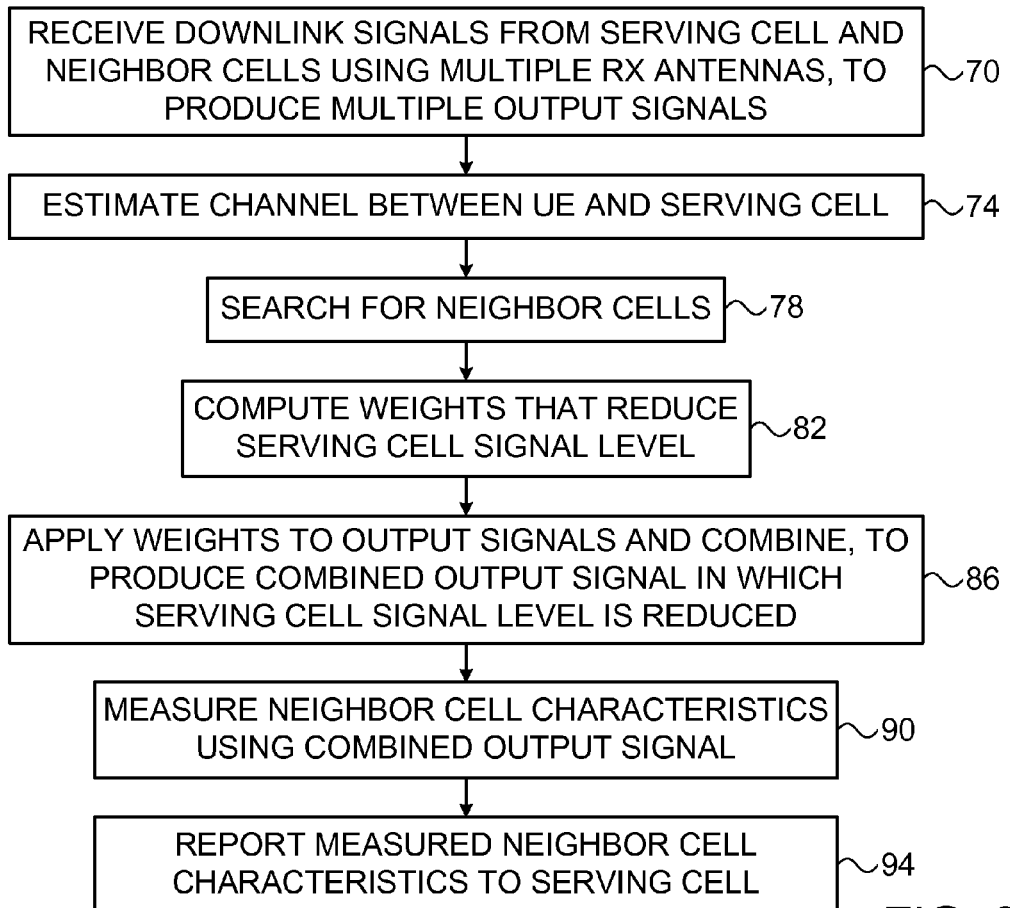
FIG. 3 is a flow chart that schematically illustrates a method for measuring neighbor cell characteristics, in accordance with an embodiment that is described herein.

FIG. 3 is a flow chart that schematically illustrates a method for measuring neighbor cell characteristics, in accordance with an embodiment that is described herein. The method begins at a reception operation 70, with downlink receiver 40 of UE 24 receiving downlink signals from the serving cell and from one or more neighbor cells. Downlink receiver 40 produces a respective output signal corresponding to the downlink signal received by each receive antenna 36. UE processor 48 estimates the channel between the UE and the serving cell ($H_0$), at a channel estimation operation 74. UE processor 48 then searches for neighbor cells, at a neighbor detection operation 78.

Having detected the neighbor cells, nulling module 56 in UE processor 48 computes a set of weights to be applied respectively to the multiple output signals, at a weight computation operation 82. The weights are computed such that the level of the serving cell signal is reduced (e.g., minimized) in the resulting combined output signal. Module 56 may compute the weights using any suitable technique, such as using one of the example techniques described above. Module 56 provides the computed weights to signal combining module 52.

Module 52 applies the weights to the respective output signals and combines the weighted signals, at a weighted combining operation 86. The combined output signal is provided to estimation module 60. Module 60 estimates the characteristics of the neighbor cell signals using the combined output signal, at an estimation operation 90. Module 60 then generates feedback information based on the measured neighbor cell signal characteristics, and reports the feedback information to the serving cell using uplink transmitter 44, at a reporting operation 94.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    in a receiver, receiving transmissions from a serving cell that serves the receiver and from one or more neighbor cells, wherein the transmissions are received via multiple receive antennas to produce multiple respective output signals;
    weighting the multiple output signals with respective weights, and combining the weighted output signals to produce a combined output signal, wherein the weights are selected so as to form a composite antenna pattern having a first antenna gain in one or more first directions that point toward the neighbor cells, and a second antenna gain, lower than the first antenna gain, in a second direction that points toward the serving cell;
    measuring characteristics of the one or more neighbor cells by processing the combined output signal in which the transmissions received from the serving cell are attenuated by the composite antenna pattern.

2. The method according to claim 1, wherein receiving the transmissions comprises receiving from the serving cell and from the neighboring cells respective reference waveforms that overlap in time and frequency, and wherein the measuring characteristics of the one or more neighbor cells comprises estimating the characteristics by processing the overlapping reference waveforms.

3. The method according to claim 1, wherein weighting the output signals comprises selecting the weights in accordance with a criterion that minimizes a signal level of the serving cell.

4. The method according to claim 3, wherein the criterion further maximizes the signal level of the neighbor cells.

5. The method according to claim 1, wherein weighting the output signals comprises estimating a channel response of a communication channel between the serving cell and the receiver, and selecting the weights based on the estimated channel response.

6. The method according to claim 1, comprising reporting the measured characteristics of the neighbor cells to the serving cell.

7. The method according to claim 6, wherein reporting the measured characteristics comprises correcting the measured characteristics so as to compensate for the weights.

8. The method according to claim 1, wherein weighting the output signals with the weights is performed only when the serving cell and the neighbor cells are synchronized with one another.

9. The method according to claim 1, wherein weighting the output signals comprises forming in the composite antenna pattern a spatial null directed toward the serving cell.

10. Apparatus, comprising:
    multiple receive antennas;
    a receiver, which is configured to receive transmissions from a serving cell that serves the receiver and from one or more neighbor cells, wherein the transmissions are received via the multiple receive antennas so as to produce multiple respective output signals; and
    a processor, which is configured to weight the multiple output signals with respective weights and combine the weighted output signals to produce a combined output signal, wherein the weights are selected so as to form a composite antenna pattern having a first antenna gain in one or more first directions that point toward the neighbor cells, and a second antenna gain, lower than the first antenna gain, in a second direction that points toward the serving cell, and to measure characteristics of the one or more neighbor cells by processing the combined output signal in which the transmissions received from the serving cell are attenuated by the composite antenna pattern.

11. The apparatus according to claim 10, wherein the receiver is configured to receive from the serving cell and from the neighboring cells respective reference waveforms that overlap in time and frequency, wherein the processor is configured to estimate the characteristics by processing the overlapping reference waveforms.

12. The apparatus according to claim 10, wherein the processor is configured to select the weights in accordance with a criterion that minimizes a signal level of the serving cell.

13. The apparatus according to claim 12, wherein the criterion further maximizes the signal level of the neighbor cells.

14. The apparatus according to claim 10, wherein the processor is configured to estimate a channel response of a communication channel between the serving cell and the receiver, and to select the weights based on the estimated channel response.

15. The apparatus according to claim 10, wherein the processor is configured to report the measured characteristics of the neighbor cells to the serving cell.

16. The apparatus according to claim 15, wherein the processor is configured to correct the measured characteristics so as to compensate for the weights.

17. The apparatus according to claim 10, wherein the processor is configured to weight the output signals with the weights only when the serving cell and the neighbor cells are synchronized with one another.

18. The apparatus according to claim 10, wherein, by weighting the output signals, the processor is configured to form in the composite antenna pattern a spatial null directed toward the serving cell.

19. A mobile communication terminal comprising the apparatus of claim 10.

20. A chipset for processing signals in a mobile communication terminal, comprising the apparatus of claim 10.

21. The method according to claim 1, wherein weighting the multiple output signals comprises reducing a relative level of a signal received from the serving cell in the composite signal.

22. The apparatus according to claim 10, wherein the processor is configured to weight the multiple output signals so as to reduce a relative level of a signal received from the serving cell in the composite signal.

23. The method according to claim 1, comprising calculating the weights by computing a weight vector that is orthogonal to a vector of channel responses between the serving cell and the receiver.

24. The apparatus according to claim 10, wherein the processor is configured to calculate the weights by computing a weight vector that is orthogonal to a vector of channel responses between the serving cell and the apparatus.

* * * * *